US012785191B2

(12) United States Patent
Medina et al.

(10) Patent No.: US 12,785,191 B2
(45) Date of Patent: Nov. 3, 2026

(54) DAMPING DEVICE AND MOUNT ASSEMBLY WITH A DAMPING DEVICE

(71) Applicant: Sumitomo Riko Company Limited, Komaki (JP)

(72) Inventors: Ricardo Medina, Novi, MI (US); Bryan McMullen, Novi, MI (US)

(73) Assignee: Sumitomo Riko Company Limited, Komaki (JP)

( * ) Notice: Subject to any disclaimer, the term of this patent is extended or adjusted under 35 U.S.C. 154(b) by 372 days.

(21) Appl. No.: 18/606,880

(22) Filed: Mar. 15, 2024

(65) Prior Publication Data

US 2025/0293368 A1 Sep. 18, 2025

(51) Int. Cl.

*H01M 50/242* (2021.01)
*F16F 1/373* (2006.01)
*F16F 15/08* (2006.01)

(52) U.S. Cl.

CPC ......... *H01M 50/242* (2021.01); *F16F 1/3732* (2013.01); *F16F 15/08* (2013.01); *H01M 2220/20* (2013.01)

(58) Field of Classification Search

CPC ............. H01M 50/242; H01M 2220/20; F16F 1/3732; F16F 15/08
USPC ........... 248/562, 635; 267/136, 140.1, 140.3, 267/140.5, 141.3, 141.5, 292–294
See application file for complete search history.

(56) References Cited

U.S. PATENT DOCUMENTS

| | | | | |
|---|---|---|---|---|
| 3,350,042 A * | 10/1967 | Stewart | F16F 1/3732 | 267/141.4 |
| 4,522,378 A | 6/1985 | Nelson | | |
| 9,945,512 B2 | 4/2018 | Kim et al. | | |
| 11,156,260 B2 * | 10/2021 | Hutchings | F16F 1/3735 | |
| 2008/0116319 A1 * | 5/2008 | Negley | F16L 5/06 | 244/119 |
| 2019/0242418 A1 | 8/2019 | Clark et al. | | |
| 2020/0231101 A1 | 7/2020 | Narita | | |
| 2022/0063732 A1 * | 3/2022 | Gaspar | B62D 27/04 | |
| 2025/0109777 A1 | 4/2025 | Furlan et al. | | |

FOREIGN PATENT DOCUMENTS

| | | |
|---|---|---|
| CN | 115571214 A | 1/2023 |
| DE | 102022102371 A1 | 8/2023 |
| EP | 3499076 B1 | 3/2021 |

OTHER PUBLICATIONS

International Search Report issued in corresponding International Application No. PCT/JP2025/007911, mailed on Jun. 23, 2025.

* cited by examiner

*Primary Examiner* — Christopher P Schwartz
(74) *Attorney, Agent, or Firm* — Brooks Kushman P.C.

(57) ABSTRACT

An elastomeric damping device, a mount assembly, and a method for assembling the mount assembly is provided. The mount assembly includes a casing having a first through-hole. The elastomeric damping device is disposed in the first through-hole and includes a main body, a bottom flange, and a head portion. The bottom flange is disposed on a bottom end of the casing and the head portion is disposed on the top end of the casing. The head portion includes at least two cut-outs which form a wedge shaped indent on an outer peripheral wall of the head portion.

18 Claims, 6 Drawing Sheets

DAMPING DEVICE AND MOUNT ASSEMBLY WITH A DAMPING DEVICE

TECHNICAL FIELD

The present specification generally relates to a mount assembly with an elastomeric damping device for reducing a vibrational load.

BACKGROUND

In general, applications which include a motor or engine may generate vibrational loads which may overtime wear down the structural integrity of various components attached together. In some applications, such as an automotive vehicle, the vibrational loads may also be generated by the wheels being driven, irrespective of whether the road is smooth or includes pot holes.

To reduce the vibrational loads, elastomeric damping devices are installed in various locations of the applications. For instance, in the context of an automotive vehicle, the elastomeric damping devices may be incorporated into various mounting structures to absorb vibrational loads. In such instances, the elastomeric damping device includes a contact portion which is configured to abut against a vehicle structure through which vibrational forces may be conducted. The mounting structure may include a through-hole through which the elastomeric damping device is inserted, wherein the contact portion has a diameter that is larger than the diameter of the through-hole and is configured to clear the mounting structure so as to place the contact portion in a position to separate the mounting structure from the vehicle structure.

Currently, the insertion of the elastomeric damping device is manually inserted into the through-hole of the mounting structure. As the diameter of the contact portion is larger than the diameter of the through-hole, passing the elastomer damping device through the through-hole may be difficult for some.

Accordingly, it remains desirable to have the elastomeric damping device configured to facilitate the manual insertion of the elastomer damping device into a through-hole of the mounting structure without compromising the effects of the device.

SUMMARY

In one configuration, an elastomeric damping device for use with a casing is provided. The casing includes a first through-hole. The elastomeric damping device is disposed in the first through-hole and includes a main body, a bottom flange, and a head portion. The main body is formed of a resilient material and includes a top end opposite of a bottom end. The main body further includes a second through-hole extending along an axial length of the main body so as to define a top opening and a bottom opening. The bottom flange is disposed on the bottom end and is concentric to the bottom opening. The head portion is disposed on the top end and is concentric to the top opening. The head portion includes at least two cut-outs that form a wedge shaped indent on an outer peripheral wall of the head portion.

The elastomeric damping device may include one or more of the following optional features. For example, each of the at least two cut-outs define a first inner wall and a second inner wall disposed on a plane, wherein the plane is defined by the axial length of the main body and a radius of the main body. The first inner wall and the second inner wall are angled with respect to each other at an angle between fifteen and sixty degrees. The elastomeric material could be made of a natural rubber or a synthetic rubber and the main body, the head portion, and the flange are formed as a unitary piece.

In one configuration, the main body may include a plurality of elongated ribs disposed in the second through-hole.

In one configuration, the main body may further include a shoulder portion disposed on a bottom end of the main body, the bottom flange disposed on a distal end of the shoulder portion.

In one configuration, the head portion may include a plurality of projections disposed on a top surface of the head portion and the at least two cut-outs are interposed between a pair of projections of the plurality of projections. In such a configuration, a pair of the plurality of projections define a depression and the at least two cut-outs are centered within a corresponding depression.

In one configuration, the main body may further include a radial rib disposed on a bottom surface of the head portion, the radial rib spaced apart from an outer surface of the main body so as to define a groove. In such a configuration, the groove may extend continuously around a circumference of the main body.

In one configuration, a mount assembly attached to a structure of an automotive vehicle is provided. The mount assembly is configured to damp a vibrational load generated by the automotive vehicle. The mount assembly includes a casing and An elastomeric damping device. The casing includes an attachment member for attachment to the structure. The casing includes a first through-hole having a top end and a bottom end. The elastomeric damping device includes a main body, a bottom flange and a head portion formed as a unitary piece and made of a resilient material. The main body is disposed in the first through-hole of the casing wherein the bottom flange abuts against the bottom end of the casing, and the head portion abuts against the top end of the casing. The bottom flange and the head portion extend radially from an outer surface of the casing, wherein the head portion includes at least two cut-outs, the at least two cut-outs forming a wedge shaped indent on an outer peripheral wall of the head portion.

The mount assembly may include one or more of the following optional features. For example, the main body may further include a shoulder portion disposed on a bottom end of the main body, the bottom flange disposed on a distal end of the shoulder portion and the casing may include a seat portion disposed in the first through-hole and configured to abut against the shoulder portion. The resilient material is one of a natural rubber or a synthetic rubber.

In one configuration, the head portion includes a plurality of projections disposed on a top surface of the head portion, the at least two cut-outs interposed between a pair of projections of the plurality of projections. In such a configuration, a pair of the plurality of projections define a depression and the at least two cut-outs are centered within a corresponding depression. Additionally, the at least two cut-outs may be equally spaced apart from each other.

In one configuration, the mount assembly may further include a shaft support, wherein the main body includes a plurality of elongated ribs disposed in the second through-hole and the shaft support is disposed in the second through-hole.

In yet another aspect of the disclosure, a method of assembling a mount assembly attached to a structure of an automotive vehicle is provided. The method includes the steps of: providing a casing having an attachment member for attachment to the structure, wherein the casing includes a first through-hole having a top end and a bottom end. The method further includes the step of providing an elastomeric damping device. The elastomeric damping device includes a main body, a bottom flange and a head portion formed as a unitary piece and made of a resilient material. The head portion includes at least two cut-outs that form a wedge shaped indent on an outer peripheral wall of the head portion. The method further includes the step of inserting the head portion into the bottom end of the first through-hole and pushing the elastomeric damping device until the head portion clears the top end of the casing, wherein the head portion expands radially and abuts against the top end of the casing and the bottom flange abuts against the bottom end of the casing so as to retain the main body of the damping device within the first through-hole of the casing.

In one configuration, the elastomeric damping device includes a radial rib disposed on a bottom surface of the head portion and the radial rib is spaced apart from an outer surface of the main body so as to define a groove.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Figure 1:
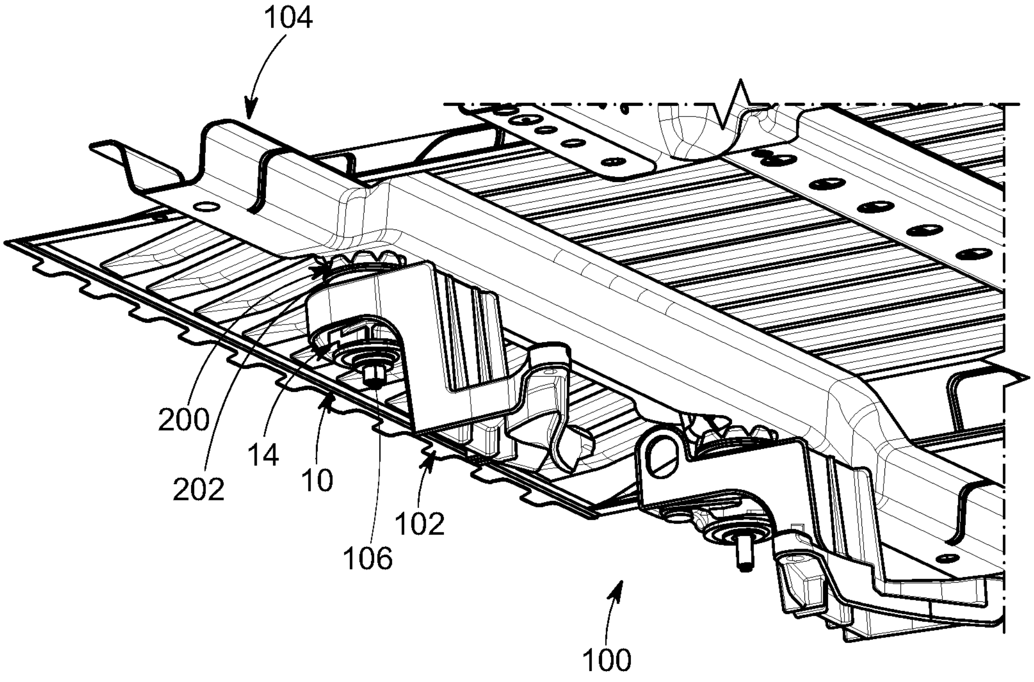
FIG. 1 is perspective view showing the mount assembly attached to a vehicle structure according to one or more aspects described herein.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring generally to the figures, embodiments of the present disclosure include a mount assembly including a casing and an elastomeric damping device. The casing includes a first through-hole having a top end and a bottom end. The damping device includes a main body, a bottom flange, and a head portion formed as a unitary piece and made of a resilient material. The main body is disposed in the first through-hole of the casing wherein the bottom flange abuts against the bottom end of the casing, and the head portion abuts against the top end of the casing. The bottom flange and the head portion extend radially from an outer surface of the casing, wherein the head portion includes at least two cut-outs, the at least two cut-outs forming a wedge shaped indent on an outer peripheral wall of the head portion so as to facilitate the compression and fit of the head portion through the casing and reduce the force required to assemble the mount assembly.

Figure 2:
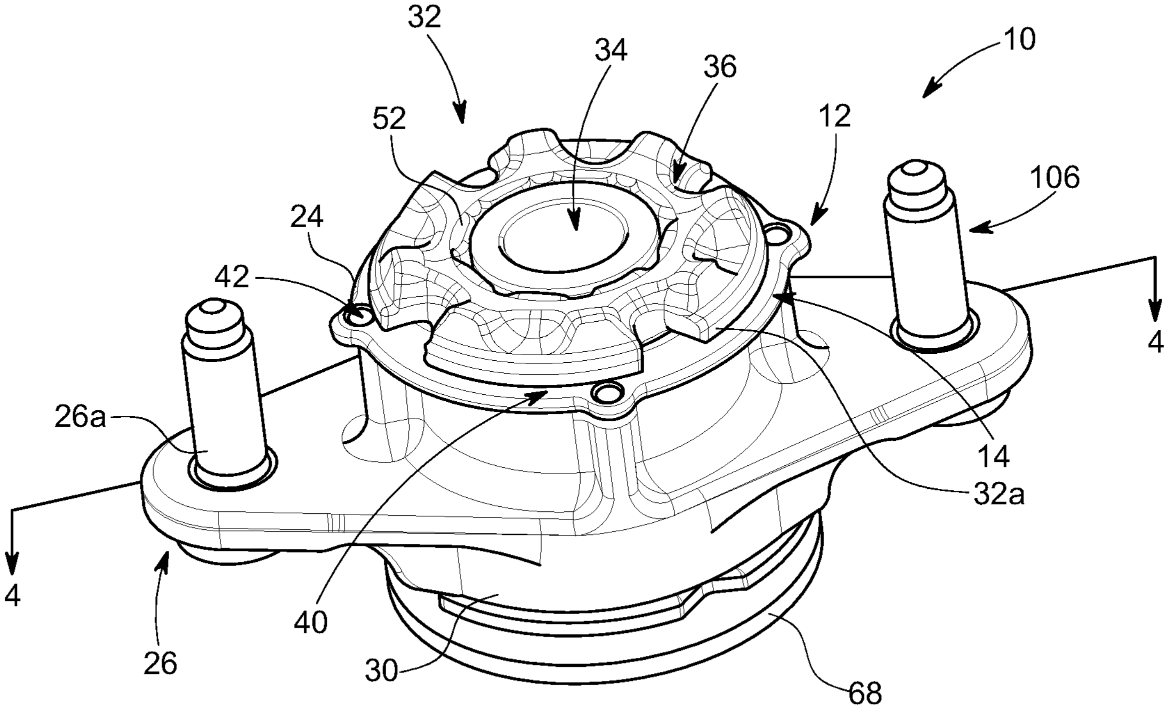
FIG. 2 is a perspective view of the mount assembly shown in FIG. 1.

With reference first to FIGS. 1 and 2, a mount assembly 10 is provided. The mount assembly 10 may be used in an automotive vehicle 100 for damping a vibrational load. In one aspect, the mount assembly 10 is attached to a bracket 102 configured to support a battery pack (not shown) and also attached to a vehicle frame 104 which conducts the vibrational load. The mount assembly 10 includes a casing 12 and a damping device 14. The casing 12 is attached to the bracket 102 wherein a portion of the damping device 14 is exposed and a vehicle frame 104 rests on top of the exposed portion of the damping device 14. The elastomeric damping device 14 is held in place by the casing 12. Accordingly, a load such as a vibrational load is damped by the mount assembly 10 so as to enhance the life and serviceability of the battery pack.

Figure 3:
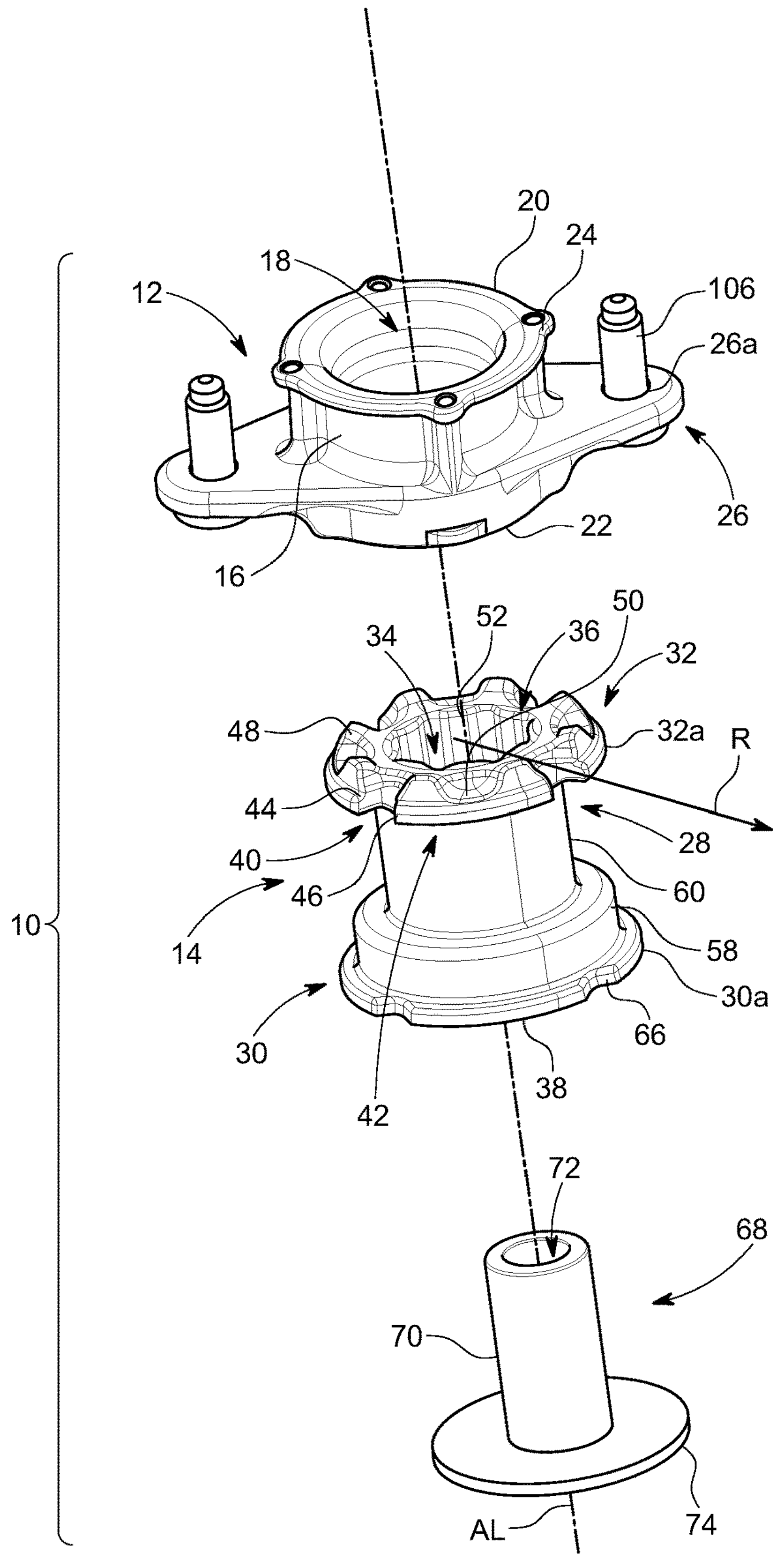
FIG. 3 is an exploded view of the mount assembly shown in FIG. 1
Figure 4:
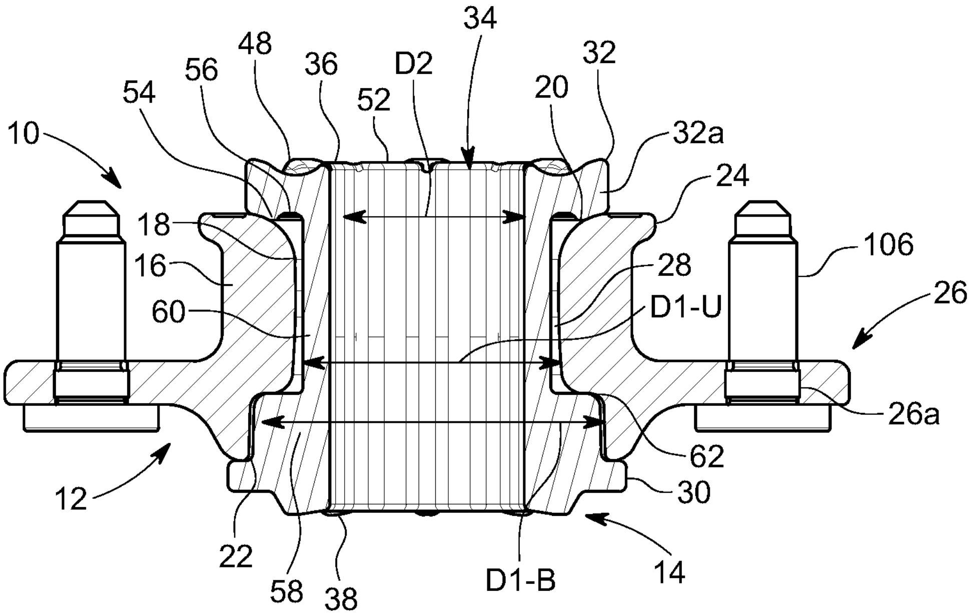
FIG. 4 is a cross-sectional view of the mount assembly shown in FIG. 2, taken along line 4-4.

With reference again to FIG. 2 and now to FIGS. 3 and 4, an isolated, exploded and cross-sectional view of the mount assembly 10 is provided. The casing 12 includes a casing body 16 which may be formed of a rigid and durable material such as steel, aluminum, or a polymer composite. The casing body 16 is a generally tubular member having a first through-hole 18 which extends along an axial length of the casing body 16. The first through-hole 18 includes a top end 20 and a bottom end 22 which is opposite of the top end 20 so as to be open on both ends of the casing 12. The top end 20 of the casing body 16 may be arcuate so as to define a lip 24 which bounds the circumference of the top end 20 of the first through-hole 18.

In one aspect, the casing 12 includes a pair of attachment members 26 disposed on opposite ends of the casing body 16. The attachment members 26 are generally planar members having a bore 26*a* for receiving a fastening device 106. In one aspect, the attachment members 26 have the same dimension and are illustratively shown as being dimensioned to narrow to a rounded end so as to be generally wing-shaped. However, it should be appreciated that the attachment member 26 may be shaped otherwise without narrowing the scope of the appended claims. The fastening device 106 is configured to be seated within a corresponding bore 26*a* of the bracket 102 so as to fix the casing 12 to the bracket 102. The attachment members 26 and the casing body 16 may be formed as a unitary piece through a stamping, casting, or molding process.

With reference again to FIGS. 3 and 4, when the mount assembly 10 is assembled, the elastomeric damping device 14 is disposed in the first through-hole 18 of the casing 12. The elastomeric damping device 14 includes a main body 28, a bottom flange 30, and a head portion 32. The elastomeric damping device 14 may be formed of a resilient material such as a natural or synthetic rubber. In one aspect, the resilient material may be vulcanized or otherwise treated to improve the physical properties of the material, such as the tensile strength, elasticity, or resistance to swelling and abrasion. The main body 28 is a tubular member having a second through-hole 34 extending along an axial length "AL" of the main body 28 so as to define a top opening 36 and a bottom opening 38. The second through-hole 34 includes a diameter "D2" that may be substantially constant along the axial length of the damping device 14. The bottom flange 30 is disposed at a distal end of the main body 28 and is concentric to the bottom opening 38. The head portion 32 is disposed at a proximal end of the main body 28 and is concentric to the top opening 36.

Figure 5:
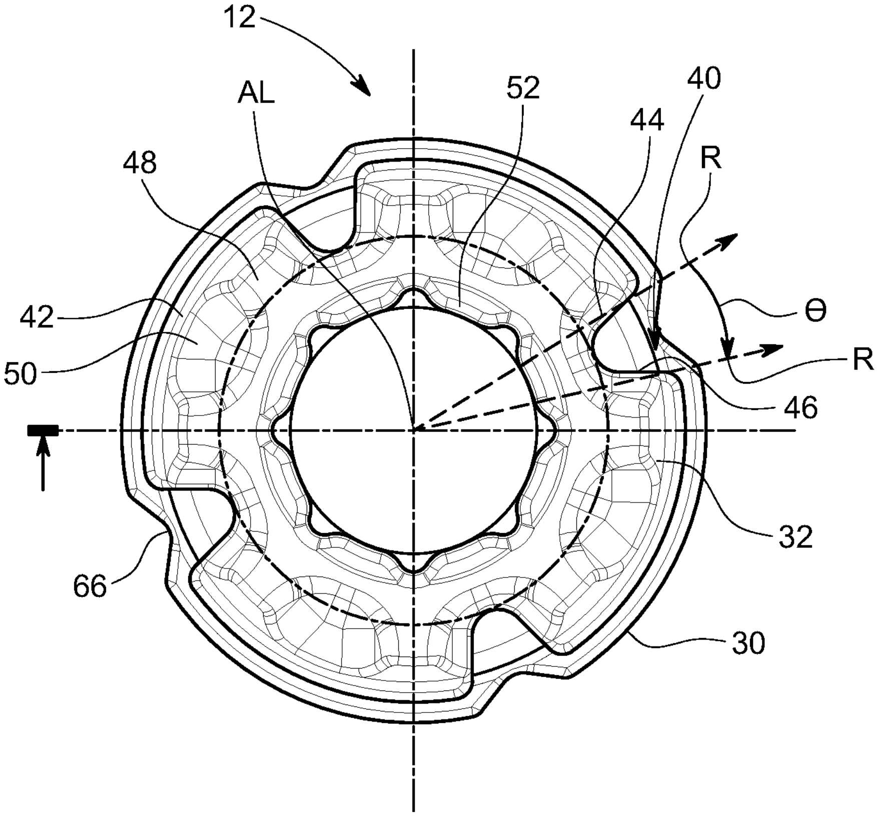
FIG. 5 is a top down plan view of the damping device shown in FIG. 3.

With reference again to FIG. 3 and now to FIG. 5, the head portion 32 includes at least two cut-outs 40 that form a wedge shaped indent on an outer peripheral wall 32*a* of the head portion 32. The cut-outs 40 are spaced apart from each other to define a petal member 42. Each of the cut-outs 40 define a first inner wall 44 and a second inner wall 46 disposed on a plane that is defined by the axial length "AL" of the main body 28 and a radius "R" of the main body 28. The first inner wall 44 and the second inner wall 46 are angled with respect to each other at an angle "ϴ" between fifteen and sixty degrees. The head portion 32 may include a plurality of projections 48 disposed on a top surface of the head portion 32. The projections 48 extend upwardly and may be dimensioned the same as each other. For illustrative purposes, the projections 48 have a ramp shape and are spaced apart from each other to define a depression 50 between a pair of adjacent projections 48, and the cut-outs 40 are centered within a corresponding depression 50. For illustrative purposes, the head portion 32 is shown as having eight (8) projections 48 defining eight (8) depressions 50, four (4) cut-outs 40, and four (4) petal members 42. However, it should be appreciated that the number of cut-outs 40, projections 48, and depressions 50 shown are illustrative and may vary based upon various factors to include the diameter of the first through-hole 18, the length of the casing 12, the material used to make the damping the device, and the like. Thus, the number or cut-outs 40, projections 48, and depressions 50 shown are not limiting to the scope of the appended claims.

With reference again to FIG. 3 and now to FIG. 4, the main body 28 may include a plurality of elongated ribs 52 disposed in the second through-hole 34. The elongated ribs 52 are rotunded beads and each elongated rib 52 is shown shaped and dimensioned similar to each other. Each of the elongated ribs 52 may be equally spaced apart from each other. The elongated ribs 52 may extend the entire length of the second through-hole 34, as shown in FIG. 4. However, it should be appreciated that the elongated ribs 52 may have an axial length shorter than the length of the second through-hole 34. For illustrative purposes, the main body 28 includes eight (8) elongated ribs 52; however, it should be appreciated that the main body 28 may include more or less elongated ribs 52 without deviating from the scope of the appended claims.

Figure 7:
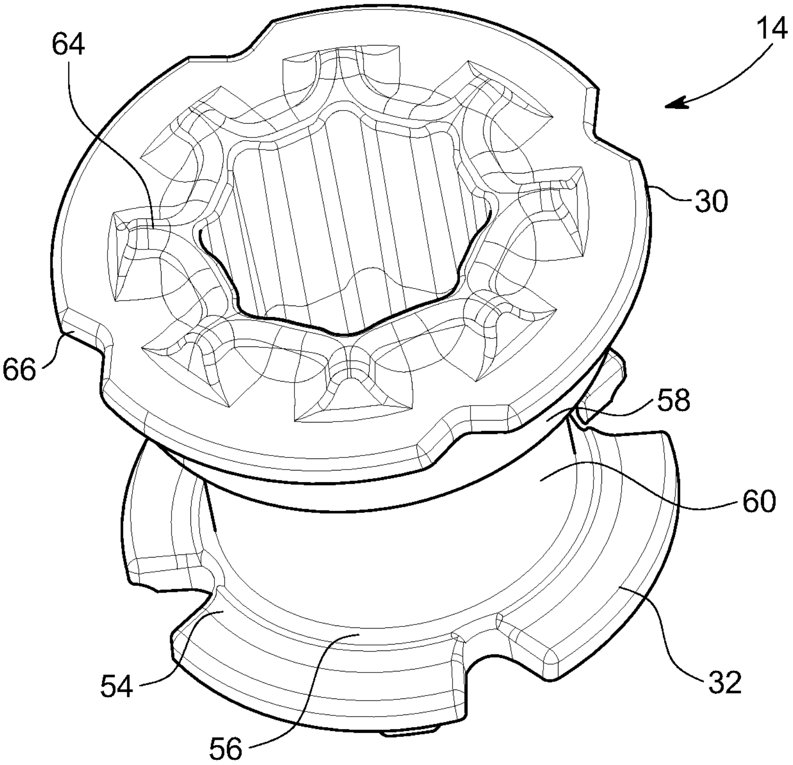
FIG. 7 is a perspective view of the damping device shown in FIG. 3 taken from the bottom.

With reference again to FIG. 4 and now to FIG. 7, the main body 28 may further include a radial rib 54 disposed on a bottom surface of the head portion 32. The radial rib 54 is spaced apart from an outer surface of the main body 28 so as to define a groove 56. The groove 56 may extend continuously around a circumference of the main body 28. As shown in FIG. 7, the bottom surface of the head portion 32 includes four (4) radial ribs 54 which are separated from each other by a cut-out 40.

Figure 6:
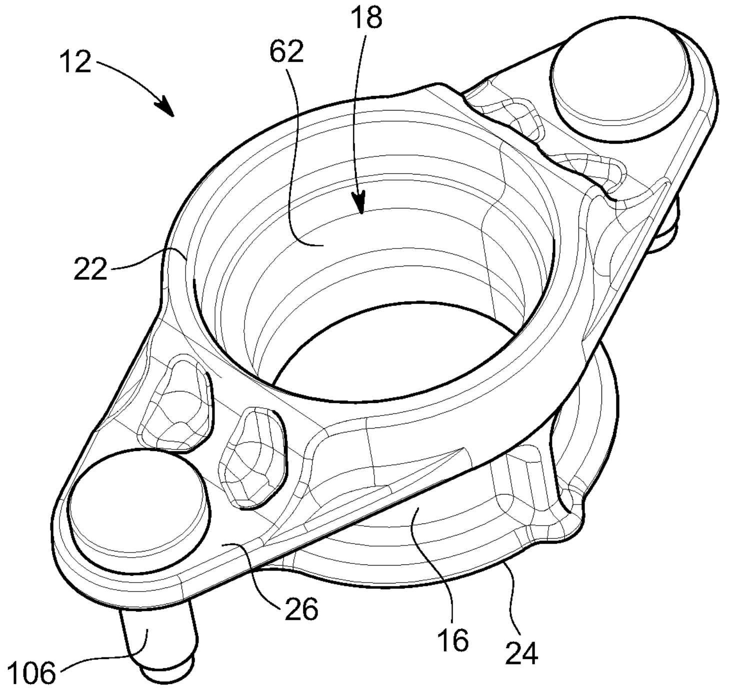
FIG. 6 is a perspective view of the casing shown in FIG. 3 taken from the bottom.

With reference again to FIGS. 4 and 7, and now to FIG. 6, the main body 28 may further include a shoulder portion 58 disposed on the bottom of the main body 28 and a neck portion 60 interposed between the shoulder portion 58 and the head portion 32. The bottom flange 30 is disposed on a distal end of the shoulder portion 58 so as to place the shoulder portion 58 between the bottom flange 30 and the neck portion 60. The shoulder portion 58 has a thickness, as measured along the radius "R" of the damping device 14, that is thicker than a thickness of the neck portion 60 and may be generally the same thickness as the thickness of the head portion 32.

FIGS. 6 and 7 provide a perspective view of the casing 12 and the elastomeric damping device 14 taken from the bottom. The first through-hole 18 of the casing 12 has a diameter that changes so as to define a seat portion 62. Namely, the first through-hole 18 includes a bottom diameter "D1-B" and an upper diameter "D1-U" (see FIG. 4). The bottom diameter "DI-B" is substantially constant and extends upwardly from the bottom end 22 of the first through-hole 18 of the casing 12 to the seat portion 62 of the casing body 16. The upper diameter "D1-U" extends from the seat portion 62 to the top end 20 of the first through-hole 18, wherein a thickness of the casing 12 from the bottom end 22 to the seat portion 62 is less than a thickness of the casing 12 from the seat portion 62 to the top end 20. The axial length from the bottom end 22 to the seat portion 62 is dimensioned to be substantially the same as the height "H" of the shoulder portion 58 of the main body 28 so as to place the top surface of the shoulder portion 58 into contact with the seat portion 62 during installation. The seat portion 62 has a height "H2", as measured by the axial length of the casing 12, that is substantially the same as a height of the neck portion 60.

FIG. 7 shows an aspect of the bottom flange 30 wherein the bottom surface of the bottom flange 30 includes a plurality of protuberances 64 arranged along the circumference of the bottom opening 38 of the second through-hole 34. The protuberances 64 may be shaped similarly to the projections 48 and may be equally spaced apart from each other. An outer peripheral wall 30*a* of the bottom flange 30 may further include a plurality of indents 66 shaped as wedges.

A description of the operation of the elastomeric damping device 14 will now be provided in the context of an automotive vehicle 100. In particular, the damping device 14 is a component of a mount assembly 10 that is configured to support a component such as a battery. The mount assembly 10 may further include a shaft support 68 which is configured to attach the mount assembly 10 to a structure of an automotive vehicle 100, such as a vehicle frame 104. As shown in FIGS. 1 through 3, the shaft support 68 includes a tubular body 70 having a third through-hole 72 and a flattened head portion 74 extending radially from a top end 20 of the tubular body 70. A fastening device 106, such as a bolt, is inserted into the tubular body 70 of the shaft support 68, wherein the head of the fastening device 106 secures the mount assembly 10 to the vehicle frame 104 and the distal end of the shaft of the fastening device 106 is closed by a nut. When installed, the mount assembly 10 is configured to damp a vibrational load generated by the automotive vehicle 100. In such an aspect, the flattened head portion 74 is pressed against the bottom flange 30 of the damping device 14 wherein the tubular body 30 is pressed against the automotive structure, such as the vehicle frame 104. Thus as a downward load is applied to the damping device 14, the shaft support 68 prevents the damping device from being compressed more than a length of the shaft support 68 so as to help retain the structural integrity of the damping device 14 and the life of the damping device. As shown in FIG. 1, a second elastomer damping device 200 may be interposed between the elastomer damping device 14 and the vehicle frame 104 to which the elastomer damping device 14 is attached. In another aspect, a washer 204 is disposed beneath the second elastomer damping device 200. In such an assembly, the second elastomer damping device 14 is in direct contact with the vehicle frame 104 and is compressed between the vehicle frame 104 and the washer 202. Thus, the second elastomer damping device 200 and the washer 204 translate a downward force of the vehicle frame 104 onto the head portion 32 of the elastomer damping device 14, wherein the head portion 32 is compressed between the washer 204 and the lip 24 of the casing 12 and the compression of the main body 28 of the elastomer damping device 14 is limited by the tubular body 70 of the shaft support 68.

To assemble the mount assembly 10, the head portion 32 of the damping device 14 is inserted into the bottom end 22 of the first through-hole 18 of the casing 12. As the head portion 32 is inserted, the petal members 42 are bent onto the main body 28 and, simultaneously, the first inner wall 44 and the second inner wall 46 of each cut-out 40 is pressed towards each other, reducing the diameter of the head portion 32 to the diameter of the first through-hole 18 and reducing the force needed to push the damping device 14 through the first through-hole 18. The elastomeric damping device 14 is pushed through the first through-hole 18 until the shoulder portion 58 abuts against the seat portion 62 of the casing 12. As the length of the neck portion 60 is substantially the same as the length of the seat portion 62 of the casing 12, the petal members 42 may be caught on the peripheral edge of the top opening 36 of the first through-hole 18, in which case, the groove 56 is compressed generating a reactionary force to urge the petal members 42 outwardly and radially so as to deploy to its natural position. It may be that the shoulder portion 58 needs to be compressed to facilitate the clearing of the petal members 42 from the second through-hole 34. When the petal members 42 are fully deployed, as shown in FIG. 4, the radial rib 54 and the bottom surface of the head portion 32 rest against the top end 20 of the casing 12, the top surface of the shoulder portion 58 abuts against the bottom surface of the seat portion 62, and the top surface of the bottom flange 30 abuts against the bottom end 22 of the casing 12.

As shown in FIG. 1, the mount assembly 10 may be fixed to a bracket 102 which is configured to support a vehicle component such as a battery. In particular, the attachment members 26 are registered to corresponding bolt holes (not shown) of the bracket 102 and secure thereto. The shaft portion may be inserted into the second-through hole either before or after the attachment of the mount assembly 10 to the bracket 102. A fastener is inserted into the shaft portion and secures the mount assembly 10 to a vehicle frame 104 wherein the head portion 32 of the elastomeric damping device 14 is disposed underneath and in contact with the vehicle frame 104. The vehicle frame 104 is made of a rigid material such as steel and conducts vibrational load which is damped by the elastomeric damping device 14, thereby reducing a vibrational load onto the vehicle component (e.g. battery).

Figure 9:
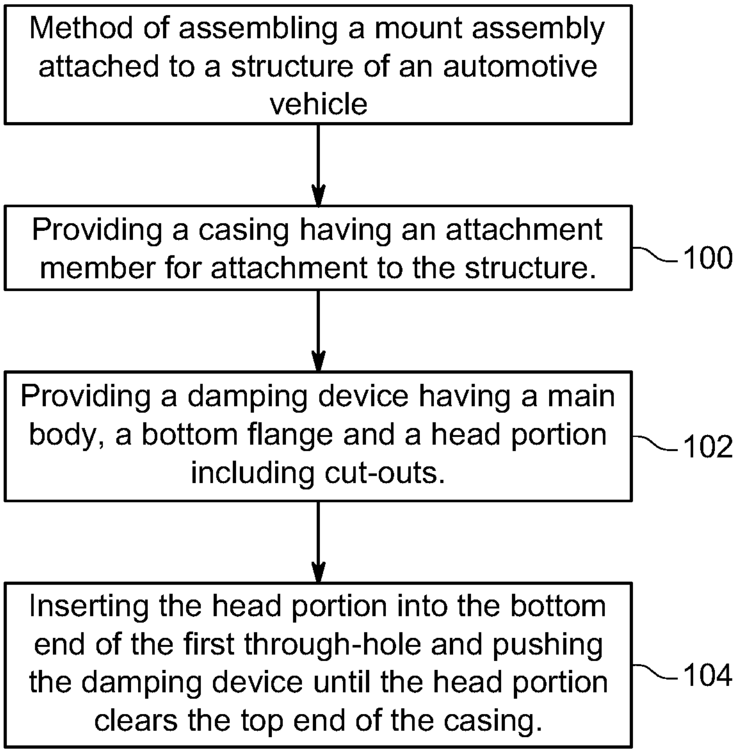
FIG. 9 is a diagram showing the steps of a method of assembling a mount assembly attached to a structure of an automotive vehicle

With reference now to FIG. 9, a method of assembling a mount assembly 10 attached to a structure of an automotive vehicle 100 is provided. At step 100, the method includes providing a casing 12 having an attachment member 26 for attachment to the structure, wherein the casing 12 includes a first through-hole 18 having a top end 20 and a bottom end 22. At step 102, the method includes providing an elastomeric damping device 14. The elastomeric damping device 14 includes a main body 28, a bottom flange 30, and a head portion 32 formed as a unitary piece and made of a resilient material. The head portion 32 includes at least two cut-outs 40 that form a wedge shaped indent on an outer peripheral wall 32*a* of the head portion 32. It should be appreciated that step 100 and 102 may be performed concurrently or in different order. At step 104, the method includes inserting the head portion 32 into the bottom end 22 of the first through-hole 18 and pushing the elastomeric damping device 14 until the head portion 32 clears the top end 20 of the casing 12, wherein the head portion 32 expands radially and abuts against the top end 20 of the casing 12 and the bottom flange 30 abuts against the bottom end 22 of the casing 12 so as to retain the main body 28 of the elastomeric damping device 14 within the first through-hole 18 of the casing 12.

Figure 8:
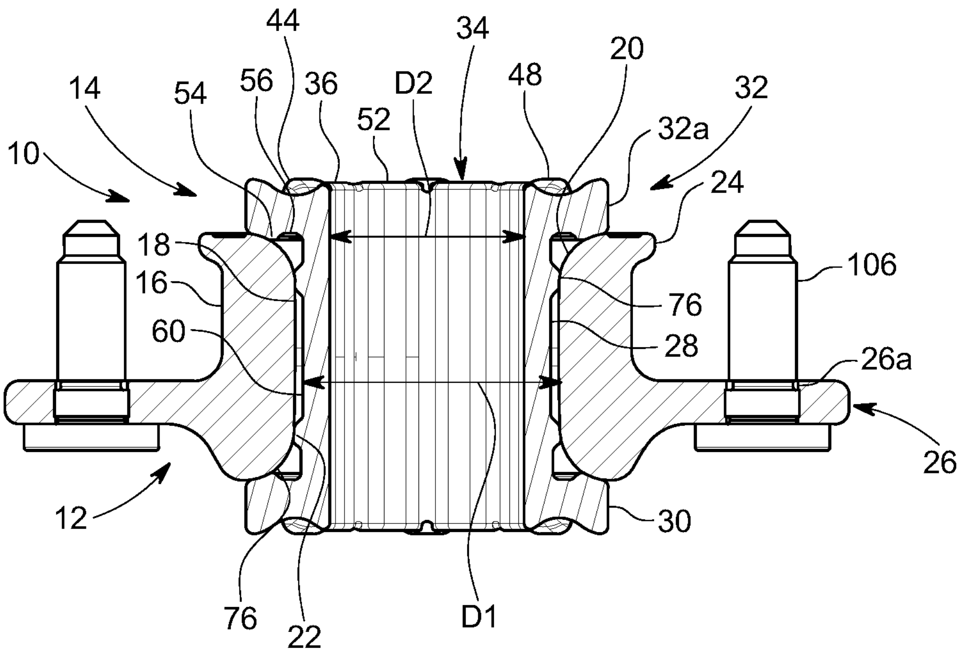
FIG. 8 is a cross-sectional view of a mount assembly according to a second aspect of the mount assembly.

The description provided herein is illustrative and not limiting in nature. Various adaptions of the mount assembly 10 may be made without deviating or narrowing the scope of the appended claims. For example, FIG. 8 depicts an aspect where the first through-hole 18 of the casing 12 has a substantially constant diameter "D1", and the main body 28 of the damping device 14 includes a pair of circumferential ribs which are spaced apart from each other and dimensioned to be pressed against the inner wall of the main body 28 defining the second through-hole 34.

Accordingly, the mount assembly 10 disclosed herein includes an elastomeric damping device 14 configured to reduce the force needed to install the damping device 14 within a casing 12 of the mount assembly 10.

While particular embodiments have been illustrated and described herein, it should be appreciated and understood that various other changes and modifications may be made without departing from the spirit and scope of the claim subject matter. Moreover, although various aspects of the claim subject matter have been described herein, such aspects need not be utilized in combination. It is therefore intended that the appended claims cover all such changes and modifications that are within the scope of the claim subject matter.

The invention claimed is:

1. An elastomeric damping device for use with a casing having a first through-hole having a top end opposite of a bottom end, the elastomeric damping device disposed in the first through-hole, the elastomeric damping device comprising:

a main body formed of a resilient material, the main body having a top end and a bottom end, the main body including a second through-hole extending along an axial length of the main body so as to define a top opening and a bottom opening;

a bottom flange disposed on the bottom end and concentric to the bottom opening;

a head portion disposed on the top end and concentric to the top opening, the head portion including at least two cut-outs, the at least two cut-outs forming a wedge shaped indent on an outer peripheral wall of the head portion; and a radial rib disposed on a bottom surface of the head portion, the radial rib spaced apart from an outer surface of the main body so as to define a groove.

2. The elastomeric damping device as set forth in claim 1, wherein the head portion includes a plurality of projections disposed on a top surface of the head portion, the at least two cut-outs interposed between a pair of projections of the plurality of projections.

3. The elastomeric damping device as set forth in claim 2, wherein a pair of the plurality of projections define a depression and the at least two cut-outs are centered within a corresponding depression.

4. The elastomeric damping device as set forth in claim 1, wherein each of the at least two cut-outs define a first inner wall and a second inner wall disposed on a plane defined by an axial length of the main body and a radius of the main body, the first inner wall and the second inner wall angled with respect to each other at an angle between fifteen and sixty degrees.

5. The elastomeric damping device as set forth in claim 1, wherein the resilient material is one of a natural rubber and a synthetic rubber.

6. The elastomeric damping device as set forth in claim 1, wherein the main body, the head portion, and the flange are formed as a unitary piece.

7. The elastomeric damping device as set forth in claim 1, wherein the main body includes a plurality of elongated ribs disposed in the second through-hole.

8. The elastomeric damping device as set forth in claim 1, further including a shoulder portion disposed on a bottom end of the main body, the bottom flange disposed on a distal end of the shoulder portion.

9. The elastomeric damping device as set forth in claim 1, wherein the groove defined by the radial rib extends continuously around a circumference of the main body.

10. A mount assembly attached to a structure of an automotive vehicle, the mount assembly for damping a vibrational load generated by the automotive vehicle, the mount assembly comprising:

a casing having an attachment member for attachment to the structure, the casing including a first through-hole having a top end and a bottom end; and an elastomeric damping device including a main body, a bottom flange, and a head portion formed as a unitary piece and made of a resilient material, the main body disposed in the first through-hole of the casing wherein the bottom flange abuts against the bottom end of the casing, and the head portion abuts against the top end of the casing, the bottom flange and the head portion extending radially from an outer surface of the casing, wherein the head portion includes at least two cut-outs, the at least two cut-outs forming a wedge shaped indent on an outer peripheral wall of the head portion, the head portion further including a radial rib disposed on a bottom surface of the head portion, the radial rib spaced apart from an outer surface of the main body so as to define a groove.

11. The mount assembly as set forth in claim 10, wherein the head portion includes a plurality of projections disposed on a top surface of the head portion, the at least two cut-outs interposed between a pair of projections of the plurality of projections.

12. The mount assembly as set forth in claim 11, wherein a pair of the plurality of projections define a depression and the at least two cut-outs are centered within a corresponding depression.

13. The mount assembly as set forth in claim 12, wherein the at least two cut-outs are equally spaced apart from each other.

14. The mount assembly as set forth in claim 13, further including a shaft support, wherein the main body includes a top end and a bottom end, and a second through-hole extending along an axial length of the main body so as to define a top opening and a bottom opening, wherein the main body further includes a plurality of elongated ribs disposed in the second through-hole and the shaft support is disposed in the second through-hole.

15. The mount assembly as set forth in claim 10, wherein the main body further includes a shoulder portion disposed on a bottom end of the main body, the bottom flange disposed on a distal end of the shoulder portion.

16. The mount assembly as set forth in claim 15, wherein the casing includes a seat portion disposed in the first through-hole and configured to abut against the shoulder portion.

17. The mount assembly as set forth in claim 10, wherein the resilient material is one of a natural rubber and a synthetic rubber.

18. A method of assembling a mount assembly attached to a structure of an automotive vehicle, the method comprising the steps of:

providing a casing having an attachment member for attachment to the structure, the casing including a first through-hole having a top end and a bottom end;

providing an elastomeric damping device, the elastomeric damping device including a main body, a bottom flange, and a head portion formed as a unitary piece and made of a resilient material, wherein the head portion includes at least two cut-outs, the at least two cut-outs forming a wedge shaped indent on an outer peripheral wall of the head portion, the head portion further including a radial rib disposed on a bottom surface of the head portion, wherein the radial rib is spaced apart from an outer surface of the main body so as to define a groove; and inserting the head portion into the bottom end of the first through-hole and pushing the elastomeric damping device until the head portion clears the top end of the casing, wherein the head portion expands radially and abuts against the top end of the casing, wherein the bottom flange abuts against the bottom end of the casing so as to retain the main body of the elastomeric damping device within the first through-hole of the casing.

* * * * *